United States Patent

Ohga et al.

[15] 3,705,252
[45] Dec. 5, 1972

[54] 2,2'-DICHLORODIISOPROPYL ETHER AS A NEMATOCIDE

[72] Inventors: Shizuo Ohga, 699, 3-chome, Amanuma, Suginami-ku, Tokyo; Hideatsu Yasutomi, 444, Shinohara-cho, Kohoku-ku, Yokohama; Masuo Fujita, 604, Kitamikata-aza-Mukou-gawarakochi, Kawasaki-shi, all of Japan

[22] Filed: March 27, 1968

[21] Appl. No.: 721,549

Related U.S. Application Data

[63] Continuation of Ser. No. 408,466, Oct. 30, 1964, abandoned.

[30] Foreign Application Priority Data

Nov. 6, 1963 Japan ..................... 38/59334

[52] U.S. Cl. .............................. 424/342, 424/351
[51] Int. Cl. ................................................ A01n 9/24
[58] Field of Search .......................... 424/342, 351

[56] References Cited

UNITED STATES PATENTS

| | | | |
|---|---|---|---|
| 2,052,264 | 8/1936 | Wickert | 260/614 |
| 2,424,520 | 7/1947 | Tonkin | 424/351 X |
| 2,577,453 | 12/1951 | Crocker | 424/342 |
| 2,889,244 | 6/1959 | Youngson | 424/342 |

*Primary Examiner*—Albert T. Meyers
*Assistant Examiner*—Vera C. Clarke
*Attorney*—Ernest G. Montague

[57] ABSTRACT

A novel nematocide containing as the effective component, 2,2'-dichlorodiisopropyl ether. The invention also includes the process of destroying nematodes by applying to the sites thereof, an effective amount of 2,2'-dichlorodiisopropyl ether. A preferred embodiment of the invention includes the use of 1,2-dichloropropane together with the 2,2'-dichlorodiisopropyl ether as the nematocide.

1 Claim, No Drawings

2,2'-DICHLORODIISOPROPYL ETHER AS A NEMATOCIDE

This application is a continuation of our co-pending patent application Ser. No. 408,466, filed Oct. 30, 1964, now abandoned.

The present invention relates to a novel nematocide containing 2,2'-dichlorodiisopropyl ether as an active component.

When the same dry-soil is successively cultivated or the cultivated crop is limited to a particular kind, a considerable decrease in harvest is ordinarily expected. The major reason is, in general, thought to be due to plant parasitic nematodes. Preventive measures taken have been the suspension of successive cropping, the cultivation of resistant varieties, the heat treatment of the soil and the application of soil fumigants. A perfect protection method, however, was thought extremely difficult as the distribution of the plant parasitic nematodes in the soil often reaches a considerable depth. By way of example, the distribution of parasitic nematodes reaches to deeper than 50 cm, when an annual plant is cultivated.

Although many experimental studies have been conducted in an attempt to prepare a perfect nematocide at a low cost, no nematocide capable of efficient nematode control has been realized to date.

Now, as a result of their study and research, the inventors have developed a novel method of producing an effective nematocide at an almost unbelievable low cost by employing 2,2'-dichlorodiisopropyl ether (hereinafter referred to as "DCPE") the chemical formula of which is:

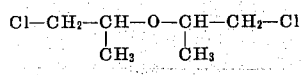

It has been found that DCPE or soil fumigants containing said DCPE as an active agent offer considerable extermination effect against plant parasitic nematodes.

The above DCPE is produced as a by-product when a propylene oxide is produced from propylene and chlorine by the chlorohydrine process. Consequently, said DCPE can be obtained at low cost as well as by a simple method.

Although DCPE may be applied by itself alone, it can also be applied in mixture with 1,2-dichloropropane (hereinafter referred to as "DCP") as is the conventional nematocide composed of a mixture consisting of dichloropropane and dichloropropene (such mixture being hereinafter referred to as "D—D").

In applying the present nematocide to the soil, it is necessary for it to be widely dispersed throughout the soil to a depth of 10–20 cm. Said nematocide can be applied as a granular powder together with a non-active solid carrier or as granules together with a non-active material. Further, it may also be applied in an emulsified state together with an emulsifier.

EXAMPLE 1.

A proper amount of the DCPE liquid was uniformly injected into soil containing root-knot nematodes in zigzag pattern 10 cm below the soil surface. The treated soil was divided into two plots for a germinative test. 15 days after the treatment, the germinative test was conducted by seeding spinach in one plot and observing germination. On the other hand, tomato seedlings were transplanted into the other plot 10 days after treatment and the development of knots was observed. At the same time, the results of these tests were compared with those obtained in plots treated with D—D.

These results were respectively figured out by the root-knot index created by Smith and Tayler. Further, the phytotoxicity of the nematocides was calculated from the germination yields obtained.

The germination yield was examined 10 days after seeding while the root-knot index was calculated from the number of root-knots occurring on the tomato roots.

Five grade values were set up in accordance with the number of root-knots occurring and the root-knot index was calculated by the equation given below.

| Numbers of root-knots | 0 | 1–10 | 11–30 | 31–50 | More than 50 |
|---|---|---|---|---|---|
| Grade value | 0 | 1 | 2 | 3 | 4 |

Root-knot index $$= \frac{\Sigma(\text{grade value} \times \text{number of plants in same grade})}{\text{Total number of examined plants} \times 4} 100$$

The experimental results are given in the Table No. 1. The germination yield and the root-knot indexes shown are the average value of three repetitions.

TABLE NO. 1

| plot | volume per injection | equivalent amount per 10 a. | germination yield (Spinach) | root-knot index (Tomato) |
|---|---|---|---|---|
| Non-controlled plot | — | — | 78.5% | 87.8% |
| D-D controlled plot | 1cc | about 11 | 87.5% | 52.7% |
| | 3cc | about 33 | 96.8% | 13.8% |
| DCPE controlled plot | 1cc | about 11 | 100.0% | 47.2% |
| | 2cc | about 22 | 86.2% | 13.5% |

It can be seen from the above Table that DCPE by itself exhibits nematocidal characteristics superior to conventional D—D. The lower germination yield in the untreated plot can be assumed to result from the fact that the young roots of the plants in this plot were attacked by nematodes thus greatly imparing the growth of the seedlings.

EXAMPLE 2.

The germination yield of spinach and the root-knot index of tomato was tested in the same manner as in Example (1) except that the nematocide used was a mixture comprising 70 parts DCPE and the 30 parts DCP. The results of this test are indicated in Table No. 2. Similar tests were conducted in a D—D controlled plot and a non-controlled plot to obtain comparative data.

TABLE NO. 2

| Plot | Volume per injection | Equivalent amount per 10 a. | Germination yield | root-knot index |
|---|---|---|---|---|
| Non-controlled plot | — | — | 80.2% | 85.7% |

| | | | | |
|---|---|---|---|---|
| D-D controlled plot | 1cc | about 11 l. | 96.3% | 55.6% |
| | 3cc | about 33 l. | 93.2% | 17.7% |
| DCPE + DCP controlled plot | 1cc | about 11 l. | 98.7% | 49.3% |
| | 2cc | about 22 l. | 88.7% | 20.0% |

As apparent from the above Table, the mixture consisting of DCPE and DCP shows superior values over the conventional nematocide D—D. Further, as seen from the above Table, the germination yield of the non-controlled plot was lower than that of other plots for the same reason mentioned in Example (1).

Further experiments conducted in the germination range above 75 percent showed that when the nematocide is injected into the soil in zigzag pattern, the optimum nematocidal effect for DCPE is obtained at 1.5 to 2.0 cc per injection and for the 70–30 mixture of DCPE and DCP at 0.7 to 1.2 cc per injection. Thus better results are obtained with both the DCPE and the mixture consisting of the DCPE and the DCP in every respect than with conventional D—D which requires 1.0 to 3.0 cc per injection. Particularly, the mixture consisting of DCPE and DCP shows significant synergistic effect.

The following are embodiments of the present invention. (All parts are by weight.)

EMBODIMENT 1.

A granular material consisting of 80 parts bentonite and 20 parts DCPE.

EMBODIMENT 2.

A granular material consisting of 70 parts bentonite and 30 parts of a mixture consisting of 70 parts DCPE and 30 parts DCP.

EMBODIMENT 3.

An emulsified material consisting of 80 percent DCPE, 1 percent polyoxyethylene alkyl-ether as emulsifier.

EMBODIMENT 4.

An emulsified material consisting of 56 percent DCPE 24 percent DCP, 1 percent polyhydric alcohol.

The diffusion agents usable in the present invention are not limited to those mentioned in the above Embodiments.

We claim:

1. The process for destroying nematodes comprising applying to a site containing nematodes, an effective amount of 2,2'-dichlorodiisopropyl ether.

* * * * *